United States Patent [19]

Renier et al.

[11] 4,247,021

[45] Jan. 27, 1981

[54] BOTTOM DISCHARGE PALLETIZED CONTAINER SYSTEM

[75] Inventors: Georges Renier, Apremont; Jackie Jullien, Saint-Jeoire Prieure, both of France

[73] Assignee: Saint-Gobain Industries, Neuilly-sur-Seine, France

[21] Appl. No.: 109,888

[22] Filed: Jan. 7, 1980

Related U.S. Application Data

[63] Continuation of Ser. No. 900,573, Apr. 27, 1978, abandoned.

[30] Foreign Application Priority Data

Apr. 27, 1977 [FR] France ................................ 77 12685

[51] Int. Cl.³ ............................................. B67D 5/32
[52] U.S. Cl. .................................. 222/143; 222/153; 222/183; 222/185; 222/556
[58] Field of Search ............... 222/143, 153, 181, 183, 222/184, 185, 502, 503, 517, 529, 536, 537, 556; 251/212; 52/192, 193, 194, 195, 197

[56] References Cited

U.S. PATENT DOCUMENTS

| | | | |
|---|---|---|---|
| 3,255,927 | 6/1966 | Rupert et al. | 222/183 X |
| 3,348,738 | 10/1967 | Hertlein | 222/517 X |
| 3,433,400 | 3/1969 | Hawkins | 222/183 X |
| 3,602,400 | 8/1971 | Cooke | 222/185 |
| 3,729,121 | 4/1973 | Cannon | 222/185 |
| 3,742,664 | 7/1973 | Reding | 222/185 X |
| 3,946,909 | 3/1976 | Wheeler | 222/181 |

FOREIGN PATENT DOCUMENTS 2220124 11/1972 Fed. Rep. of Germany.
947266 1/1964 United Kingdom ..................... 222/185

Primary Examiner—Robert J. Spar
Assistant Examiner—Fred A. Silverberg
Attorney, Agent, or Firm—John T. Synnestvedt; Charles H. Lindrooth

[57] ABSTRACT

A demountable bottom opening, foldable and reusable container for finely divided materials such as chopped glass fiber strands and other bulk, flowable materials is disclosed. The container is adapted to be mounted on a permanent pallet of great rigidity. The pallet is comprised of a skeletal base frame on which is mounted a shallow crown which receives and supports the container. The crown surrounds a central opening which is closed by hinged hexagonally-shaped flaps locked in position when the loaded containers are stored or transported. The flaps are unlocked to swing down to the sides of the opening so that they do not interfere with unloading of the container thereby insuring complete emptying. The use of an impervious foldable sleeve extending from the opening in the container and which unfolds to serve as a funnel through which the material is unloaded into a hopper beneath the pallet is also disclosed. Also disclosed are vertical support struts for interconnecting pallets so that the containers may be stacked vertically.

10 Claims, 5 Drawing Figures

BOTTOM DISCHARGE PALLETIZED CONTAINER SYSTEM

This is a continuation of application Ser. No. 900,573, filed Apr. 27, 1978, now abandoned.

BACKGROUND OF THE INVENTION

In a number of industrial applications, it is the practice to transport large quantities of finely divided materials, granular or otherwise, such as chopped up fiber glass strand, in containers like standard corrugated cardboard boxes that open towards the top or the bottom and contain 700 kg or more of material.

The use of cardboard boxes opening towards the top is only partly suitable to such heavy loads because it is necessary to use costly equipment in order to invert and unload their contents into mill hoppers or mixng apparatus. For this reason, various types of containers, formed especially of cardboard, are available which are made to open from the bottom; their lower part, is frequently reinforced by extra thickness or by a wooden floor, and are formed into a pallet assembly on their lower side to allow handling. Such arrangements usually include interlocking tongues or flaps that can be folded up into a closed position along a separation line generally provided with a glued tear-strip or with perforations, or small releasable tongues, and for emptying purposes, a passage or even a funnel, usually situated in the center. Usually, these costly and relatively fragile containers can be reused only a few times.

It must be noted that the larger the said passage, the less the stiffness remaining in the container during the emptying operations; moreover, there is a risk of incorrect draining by premature rupture of the locking mechanism in the course of handling.

On receptacles of substantial size, the passage size must be proportionally reduced, with the result that the emptying will often be incomplete because pockets of the material tend to form in dead zones, particularly in the corners. A more serious disadvantage is that a certain number of substances present flow difficulties because of their inherent nature. This is especially true of fibrous materials. During the unloading of a container which only partially opens at the base, bunching can form arches in the inside causing cessation of the unloading, especially if the passage is relatively narrow.

SUMMARY AND OBJECTS OF THE INVENTION

The purpose of the invention is therefore to cope with these disadvantages by providing an apparatus for transportation including a demountable container with large capacity, formed by combination of a folding and reusable container and a permanent pallet of great rigidity, with the object of providing a convenient handling and storage device whose usage is not too costly.

This container uses a pallet for transportation including a base carrying a crown-like tray with opening flaps or shutters which can be folded back. The tray is suitable to receive a prismatic container which has an opening base, with a large free passage which is simply formed by turned-down pieces folded back towards the inside and substantially joined together when in the closed position.

According to the invention, the pallet is provided with a frame shaped as a shallow crown whose central interior opening is entirely clear. The frame is carried and triangulated on the outside by the elements forming the sides of the base.

According to a preferred embodiment, the pallet includes a raised polygonal frame formed by elements joined rigidly together at their extremities in order to form a base provided with side openings; this base carries on its upper part elements which cut each of its corners, outlining in the inside of its contour a second polygonal frame with twice the number of sides, provided with a shallow rim intended to receive a prismatic cylinder with an opening bottom of the same shape, but entirely open in its central part. The opening formed in this way can be sealed by an opening tray formed by shutters or flaps which can be folded back and hinged on the elements of the first frame.

The structure carries as well, recessed on the inside of opening of the crown, pillow blocks on which the rigid shutters which can be folded back are hinged, which allow these shutters to retract to the sides of the opening of the crown in the course of the emptying operations; the pallet is provided with a locking device such as a removable bar maintaining the shutters in a closed position to form the tray.

The crown is intended to receive the lower edge of the container which preferably has, in known way, a horizontal section close to a circle and in particular an octagonal section. The crown has a corresponding shape, being formed with members presenting a rim extending upwardly and a ledge extending inwardly, which is preferably continuous, and is placed in the inside of a square-shaped base. The four hinged shutters are mounted on the base and the sides of the crown at the corners of the base overlap the shutters.

It is possible to imagine other forms, for example, to use a hexagonal crown put in a base which is triangular-shaped base, or even rectangular-shaped, but these forms are usually not as advantageous in many respects.

The triangulated pallet corresponding to the invention has a great rigidity in spite of its large internal opening and it presents, in addition, the advantage of offering great handling and storage facilities. It can, of course, be moved by fork-lift trucks because of openings provided on the base sides and, because the external triangulation formed by this base develops a kind of star which surrounds the crown developing at least three, and usually four, exterior triangles on the polygon, it is well supported in the horizontal plane with various possibilities of hooking the angles for suspension of the pallet to a tackle, for example, under a rolling bride-type crane with the help of shackles fixed in appropriate openings. It gives as well great security for container-stacking by means of auxiliary vertical struts for joining vertically stacked pallets. In a particularly simple and advantageous way, the cross-pieces are provdided with bars inserted vertically in holes cut on the top of the base in the region of the exterior triangles, for instance, in the shape of an open tube at the corners developing at the same time a foot.

Moreover, it is useful to provide an impervious skirt running laterally along the opened flaps of the container to assist in the unloading. This skirt can have the shape of an external impervious envelope which unfolds during the opening but it is advisable to give it the shape of an internal waterproof liner opened at its lower end, assembled in the center at the convergence point of the flaps of the container, where it will eventually be knotted by means of a detachable bond from the exterior.

During the emptying, this jacket forms along the flaps freed by the swinging of the shutters, a funnel with continuous and curved profile, making it easier to obtain a complete draining.

BRIEF DESCRIPTION OF THE DRAWINGS

The invention is described hereafter taking into account the annexed drawings illustrating a specific example and in which.

The FIGS. 3 represent an elevation view:

3A of the fixed pallet, extending through the axis of the bolting bar, in a closed position, 3B and 3C of the pallet and of the container base with two opening stages.

DETAILED DESCRIPTION OF THE ILLUSTRATIVE EMBODIMENT

The apparatus according to the invention is especially useful for handling quantities of a finely divided substance, such as cut strands or filaments of glass in amounts as large as 1000 to 1200 kg. However, the apparatus of the invention is of interest in handling, in a general way, any solid finely divided substance presenting difficulties in discharging.

Figure 1:
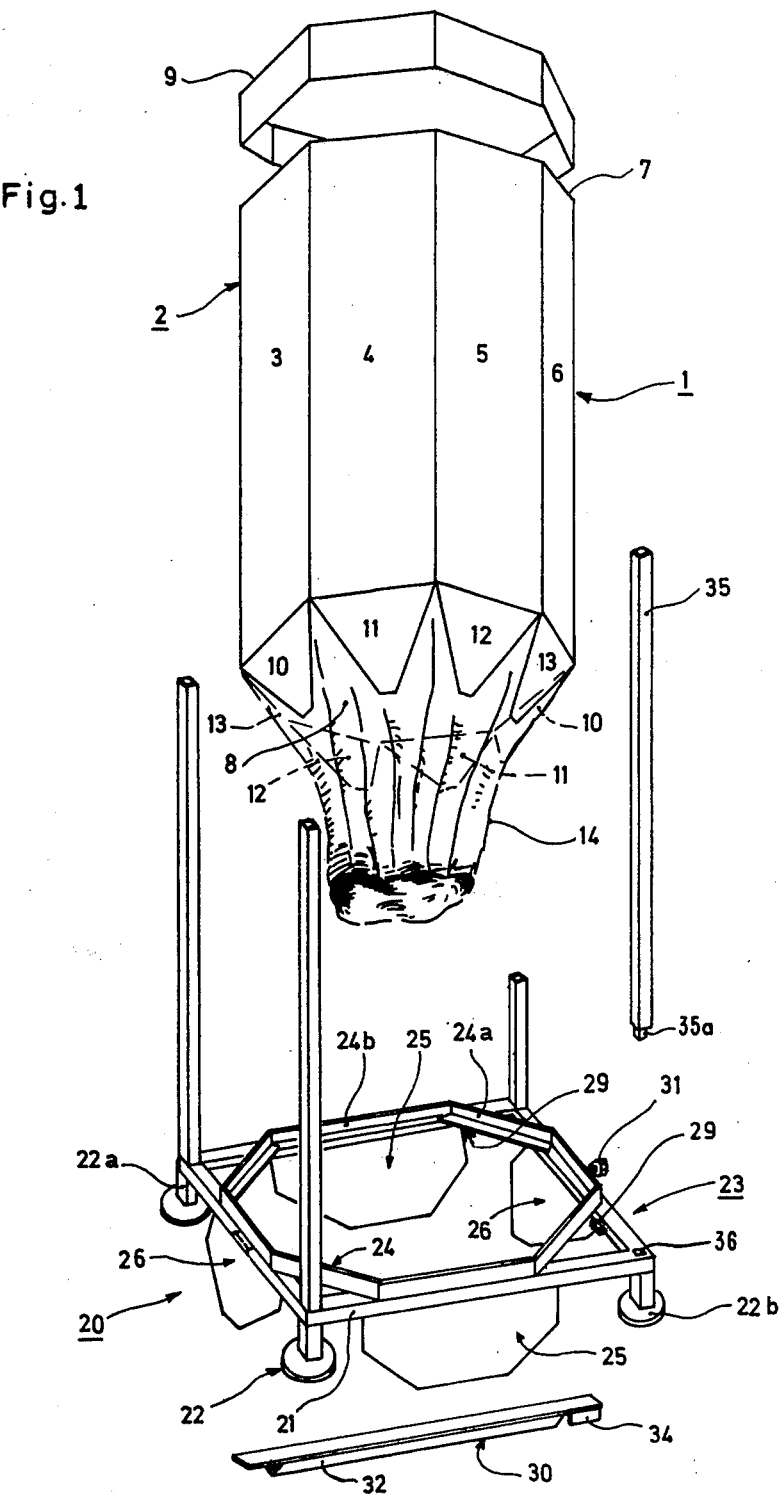
FIG. 1 is an exploded view of a preferred embodiment of a device according to the invention showing the container and its cover seen from underneath and the pallet support seen from above.

The pallet is intended to receive a container which has a substantially cylindrical cross section indicated in the drawings by the reference character 1. In the example of FIG. 1, this container 1 is comprised of parallel and opposed lateral walls 3, 4, 5, and 6, of which four can be seen that delimit an upper opening 7 and a base 8. A lid 9 fits over the opening 7. The base 8 is provided with a closing device including four pairs of opposed triangular spring flaps 10, 11, 12 and 13, which can be folded upwardly to form a wall perpendicular to the lateral walls or to open in a funnel shaped manner, as can be seen from the drawings, to distribute a finely divided material from the base of container 1.

As we shall see further, it is advantageous to provide the inside of the cylinder with a liner such as 14.

In the preferred form of the invention the body and the spring flaps of the container are formed of a foldable material, in this case a fibrous material such as corrugated cardboard and can thus be laid flat for shipment or storage when empty. The body 2 and the triangular spring flaps are formed from only one width of corrugated cardboard, thus the spring flaps are jointly connected to the body. When the container is used to handle and distribute a substance such as chopped glass fibers whose total weight can reach 1000 to 1200 kg, it is advisable to use a heavy cardboard with double corrugations, weighing, for instance, 1460 g/m$^2$.

The containers according to the invention however can be realized with folding material of other types, for example, sheet plastic or even metal.

The pallet indicated in the drawings by reference number 2, has a metal frame. By reference to FIGS. 1 and 2, one can see that the frame preferably comprises four tubular members 21 having a square cross-section welded at their extremities on four vertical tube members 22a also of square cross-section in order to form a base 23 supported by four legs 22 with feet of which three feet 22b can be seen in the Figures. Four angle members 4a connected to four flat irons 24b and fixed on the upper part of the base 23 define a frame-support with a ledge and a rim, turned in order to receive the bottom of the container 1. The angles 24a and flat irons 24b form a regular octagonally shaped relatively narrow crown 24.

Pairs of opposed rigid shutters 25 and 26 are mounted on shafts 27 and 28. The shafts are journalled in pillow blocks or like bearing elements 29 fixed on the inside surfaces of the tubular elements 21 forming the base 23, under the members 24a. The shutters are able to swing rotatably on the four sides of the base which are common to sides of the octagon. It can be seen that the pallet then provides a large central passage and that the triangulation of the octagon formed on the outside of the crown 24 by the elements 23 gives it a great rigidity.

Finally, there is provided a locking bar 30 and a locking screw 31 for locking the shutters in close position.

Figure 2:
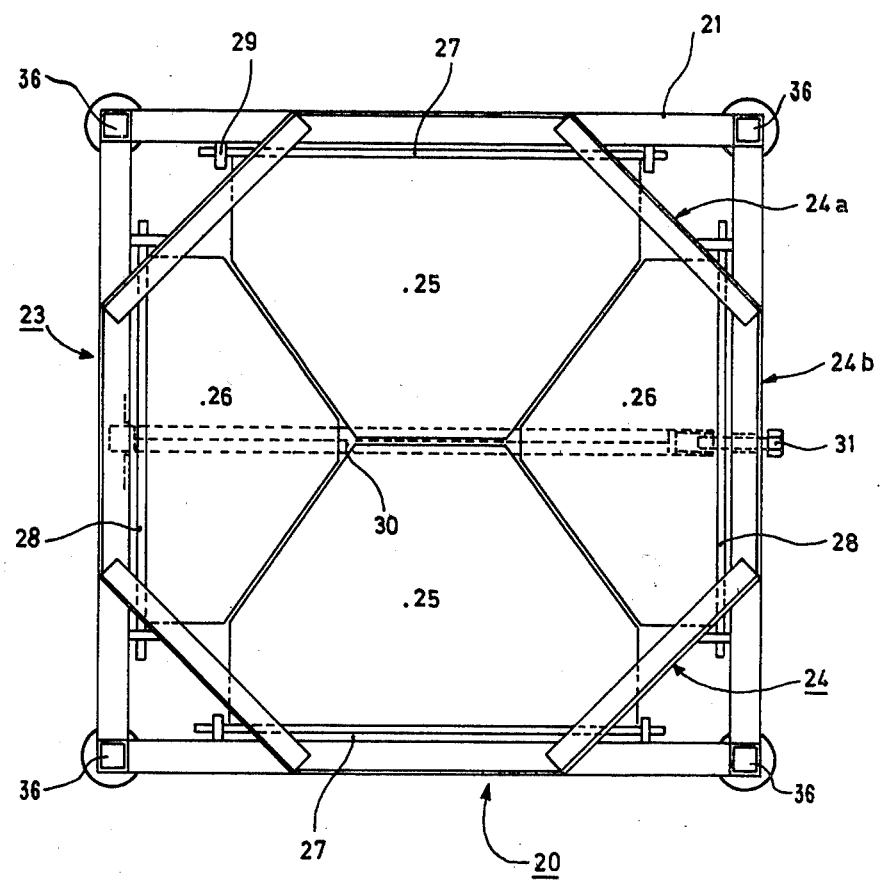
FIG. 2 is a plan view of the pallet with foldaway plates.

By referring to FIG. 2, one can see, in this example, that the shutters 25 and 26 are irregular hexagons of which four opposed sides thereof are parallel in pairs. In a closed position the parallel sides of the shutters 25 opposed to the axes of rotation 27 are joined together and thus rest on the upper side of the locking bar 30, along its longitudinal axis which corresponds to the common mid-perpendicular to the sides of the base 23 on which are mounted the axis 28 of shutters 26; the shutters 26 rest on the upper side of the locking bar 30 (as well as on this mid-perpendicular connected with the sides of hexagons parallel to axis 28). The opposed non-parallel sides of each shutter mate with each other.

Figure 3A:
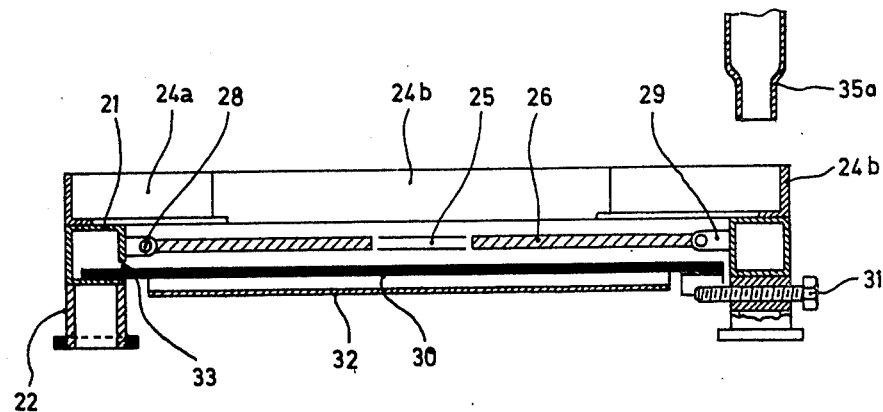

By referring to FIG. 3a, it can be seen that the locking bar 30, which consists of a flat iron reinforced on its lower side with an angle 32 welded in a V-shape along the edges of its two flanges, penetrates at one end into an opening 33 provided in one of the tubular elements 21 of the base 23 and at its other end has an eyelet-hole 34 by which it can be locked in position by the bolting screw 31. In this way, the locking bar holds the flaps or shutters 25 and 26 in horizontal position.

The shutters can be made of metal but preferably are formed from solid wooden boards mounted on a metallic frame.

It should be apparent that it is possible to manipulate the load from the bottom, for example, with the help of a lift truck, the fork of which enters between the feet of the base, or from above as well, without the traction efforts being exerted on the container, with the help of a sling put around tubular elements 21 at the corners of the base 23.

The invention is well adapted for stacking several containers in the same vertical stack by use of vertical support members or braces 35 having lower extremities 35a inserted in openings 36 in the tubes 22a of each lower pallet and upper extremities inserted into similar openings which are provided in the bottom of the feet 22b of the upper pallet. It is also possible to instead provide elements on the vertical support members capable of fitting over the tubes of the base 23.

Figure 3B:
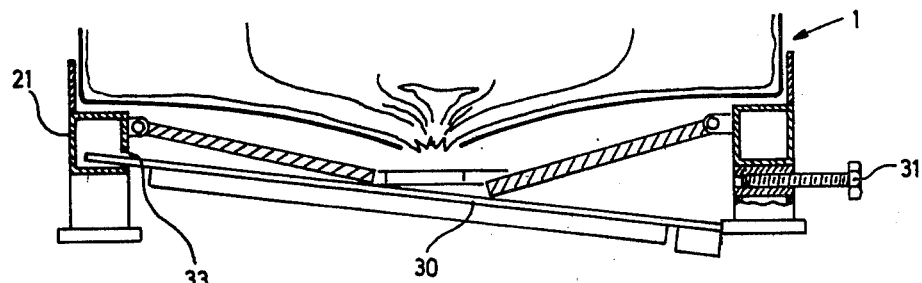
Figure 3C:
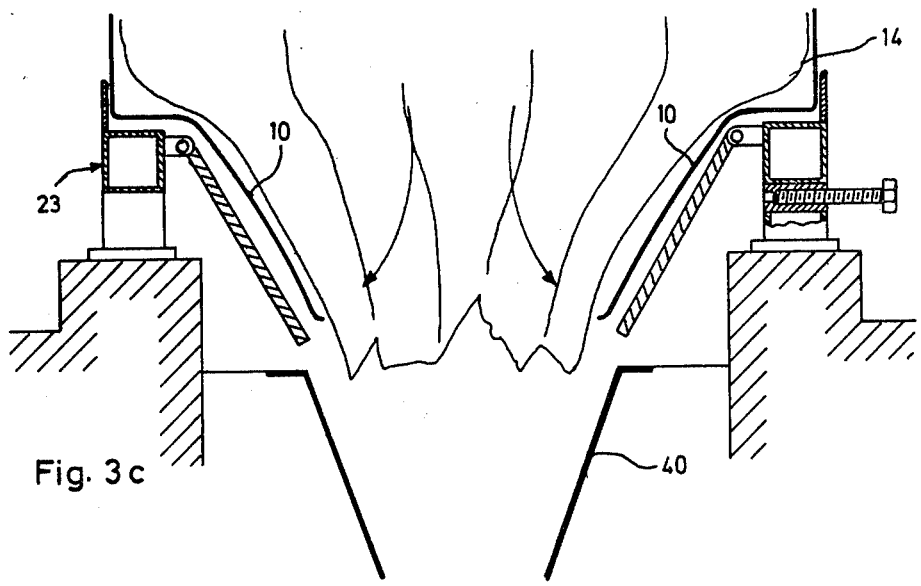

Finally, whether the filled container is set down or suspended, the discharging is done easily as shown in FIGS. 1, 3b, and 3c. The unbolting of the pallet is rapidly done by liberating the end of bar 30 locked by the screw 31, then by removing the other end from its positon in the base 23. The shutters move by pivoting around their axes and release almost the whole base of the container 1, the edges of which are supported on the narrow ledge of the octagonal crown 24 of the base 23.

Under the weight of the material, the triangular spring flaps 10 to 13 open and the unloading is then done into a receiving hopper 40.

For the handling of chopped glass fibers or the like, it is very advantageous to cover the internal wall of container 1 by a flexible tubular lining or jacket opened at the two extremities of the cylinder like the lining designated by 14 in FIG. 1. In this case it is more advisable to use a container in which the triangular spring flaps are cut off in a way parallel to their folding lines, so that they have the shape of trapezoids forming in the center of the container base an opening where the lower extremity of the flexible liner is folded. At the time of discharging, this liner unfolds and ensures the joining of the container and the receiving hopper by forming a funnel with a cuved and regular profile which makes easier the discharge of material close to the interior edges and eliminates practically any risk of dispersion of the substance out of the receiving hopper. In a general manner, the use of this jacket liner is very advantageous not only where we want to avoid any material loss, or where the dispersion of the material could cause a disturbance for the user, but in the same way to ameliorate the resistance to flow, to provide imperviousness or moisture impermeability during transportation especially if a material sensitive to humidity is handled.

According to an alternative arrangement, the flexible jacket can be disposed on the upper side of the retractable plates of the pallet. An upper extremity of the jacket may be fixed on the octagonal crown 24 and its opposite end assembled at the center of the retractable plates of the pallet 20; the cylinder base comes to rest on it. At the time of discharging, it unfolds in the same way as before and fulfills the same function.

The apparatus according to the invention can of course be used for the transportation of divided materials of the most varied kind, including pulverulent raw materials such as soda or various salts, pigments or desiccants or other charges whether hygroscopic or not, chemical products such as manures, synthetic soaps or resins, and edible products such as sugars or flours, etc.

We claim:

1. Equipment for the palletized handling of flowable solid material comprising a container for the material having vertical sidewalls, bottom closure flaps hinged to the sidewalls, a separate pallet for transportation and shipment of the container comprising a frame having spaced apart supporting members, a crown-like container support on said frame, said crown-like support comprising a relatively narrow vertical retaining flange surrounding the bottom of the container and an inwardly facing horizontal flange, said vertical retaining flange being adapted to contact the side walls of the container adjacent the bottom, said inwardly facing horizontal flange providing for support of the bottom in a narrow zone extending inwardly from the periphery thereof, said inwardly facing horizontal fange further defining a relatively large central opening extending over a substantial portion of the container bottom, retractable shutter members hingedly secured to the pallet, said shutter members being moveable from a substantially horizontal position in which the central opening and the bottom closure flaps are closed to an open position in which said central opening is substantially unrestricted and the flaps are open, and moveable locking means for locking said shutter members in said horizontal position, comprising a locking member moveable into and out of locking position, said locking member supporting the shutter members in said horizontal position when the locking member is in the locking position.

2. Equipment according to claim 1 wherein the frame is shaped in the form of a first polygon and wherein said crown-like container support is shaped in the form of a second polygon, and wherein said crown-like container support has a different number of sides than said frame.

3. Equipment according to claim 2 wherein the crown-like container support has double the number of sides of said frame.

4. Equipment according to claim 3 wherein the crown-like container support has an octagonal shape and the frame has a square shape.

5. Equipment according to claim 4 wherein the elements forming the sides of the frame are tubes having a square cross-section.

6. Equipment according to claim 4 or 5 wherein the corners of the frame are open for receiving hook suspension elements.

7. Equipment according to claim 1 wherein said locking member comprises a removable locking bar, locking bar securing means on opposite sides of the frame, said securing means being adapted to interfit with the ends of said bar for holding said locking member with its top surface supporting said shutters in the closed position.

8. Equipment according to claim 7 wherein one of said locking bar securing means comprises an opening sized to receive one end of said locking bar and the other locking bar receiving means comprises a bolt in the opposite frame member and an axial opening in the end of said locking bar, said bolt being adapted for movement into said axial opening for securing said locking bar and being removable from said axial opening whereby said locking bar is released.

9. Equipment according to claim 1 further including a flexible liner within said container, said liner serving as a conduit for material discharged from the container through the opening defined by said crown.

10. Equipment according to claim 1, further including removable vertical support struts and connecting means for connecting one end of each strut to the corners of the frame of one pallet at the top thereof and to the corners of the frame of another pallet at the bottom thereof, the struts being of a length providing for vertical stacking of loaded pallets.

* * * * *